US010202230B2

(12) United States Patent
Takagi et al.

(10) Patent No.: US 10,202,230 B2
(45) Date of Patent: Feb. 12, 2019

(54) ANIMAL LITTER BOX PACKAGE BODY

(71) Applicant: Unicharm Corporation, Shikokuchuo-shi, Ehime (JP)

(72) Inventors: Chiyo Takagi, Kagawa (JP); Shinya Kaneko, Kagawa (JP); Masanori Shibasaki, Osaka (JP); Yukihiro Otani, Osaka (JP); Nobuyuki Oka, Osaka (JP)

(73) Assignee: UNICHARM CORPORATION, Ehime (JP)

( * ) Notice: Subject to any disclaimer, the term of this patent is extended or adjusted under 35 U.S.C. 154(b) by 346 days.

(21) Appl. No.: 15/025,550

(22) PCT Filed: Sep. 25, 2014

(86) PCT No.: PCT/JP2014/075419
§ 371 (c)(1),
(2) Date: Mar. 29, 2016

(87) PCT Pub. No.: WO2015/146325
PCT Pub. Date: Apr. 2, 2015

(65) Prior Publication Data
US 2016/0251134 A1   Sep. 1, 2016

(30) Foreign Application Priority Data

Sep. 30, 2013  (JP) ................................. 2013-205841

(51) Int. Cl.
*A01K 1/01*   (2006.01)
*B65D 75/28*   (2006.01)
(Continued)

(52) U.S. Cl.
CPC .............. *B65D 75/28* (2013.01); *A01K 1/011* (2013.01); *A01K 1/0107* (2013.01);
(Continued)

(58) Field of Classification Search
CPC .... A01K 1/0107; A01K 1/011; A01K 1/0114; A01K 1/0152; A01K 1/0157; B65D 5/50;
(Continued)

(56) References Cited

U.S. PATENT DOCUMENTS 4,171,680 A * 10/1979 Silver .................. A01K 1/0107
119/165
4,271,787 A *  6/1981 Wellman .............. A01K 1/0125
119/168
(Continued)

FOREIGN PATENT DOCUMENTS

AT            12558    *  5/2012 ............... A01K 1/01
CN       102958357 A     3/2013
(Continued)

OTHER PUBLICATIONS

Extended European Search Report in EP Application No. 14849021.2, dated Aug. 11, 2016.
(Continued)

*Primary Examiner* — Kathleen I Alker
(74) *Attorney, Agent, or Firm* — Hauptman Ham, LLP

(57) ABSTRACT

Provided is a package body packaging an animal litter box with a large opening in an upper part so as to be visually recognizable from the outside, which can secure strength required for distribution. An animal litter box package body includes an animal litter box with an open upper part that can store animal excrement, an accessory, and a case packaging the animal litter box and the accessory. The case includes a top face portion that covers at least the opening, a case bottom face portion that is in contact with a bottom face portion, and a pair of side face portions facing one another; at least the top face portion is configured of a transparent sheet-like member; and the package body further includes an accessory storage container that stores the accessory and has
(Continued)

a height from a top face of the bottom face portion to the top face portion.

8 Claims, 12 Drawing Sheets

(51) Int. Cl.
  *B65D 77/04*    (2006.01)
  *B65D 5/32*    (2006.01)
  *B65D 5/42*    (2006.01)
  *B65D 5/44*    (2006.01)
  *A01K 1/015*    (2006.01)
  *B65D 75/54*    (2006.01)

(52) U.S. Cl.
  CPC .......... *A01K 1/0114* (2013.01); *A01K 1/0152* (2013.01); *B65D 5/322* (2013.01); *B65D 5/4204* (2013.01); *B65D 5/445* (2013.01); *B65D 75/54* (2013.01); *B65D 77/042* (2013.01); *B65D 2303/00* (2013.01)

(58) Field of Classification Search
  CPC ........ B65D 5/5028; B65D 5/503; B65D 5/52; B65D 81/36; B65D 75/28; B65D 5/322; B65D 5/4204; B65D 5/445; B65D 77/042; B65D 21/02; B65D 21/0209
  See application file for complete search history.

(56) References Cited

U.S. PATENT DOCUMENTS

| | | | | | |
|---|---|---|---|---|---|
| 4,779,567 | A | * | 10/1988 | Smith | A01K 1/0107 119/165 |
| 4,884,526 | A | * | 12/1989 | Giannakopoulos | A01K 1/0107 119/165 |
| 4,913,091 | A | * | 4/1990 | O'Connor | A01K 1/0107 119/168 |
| 4,932,360 | A | * | 6/1990 | O'Connor | A01K 1/0125 119/168 |
| 5,007,530 | A | * | 4/1991 | Weismantel | A01K 1/0125 119/168 |
| 5,115,766 | A | * | 5/1992 | Williams | A01K 1/0125 119/168 |
| 5,134,974 | A | * | 8/1992 | Houser | A01K 1/0107 119/165 |
| 5,303,675 | A | | 4/1994 | Van Den Bergh | |
| 5,582,135 | A | * | 12/1996 | Bellows | A01K 1/0125 119/168 |
| 5,730,085 | A | * | 3/1998 | Santoiemmo | A01K 1/0125 119/168 |
| 5,996,533 | A | * | 12/1999 | Gordon | A01K 1/0114 119/166 |
| 6,065,429 | A | * | 5/2000 | Crosse | A01K 1/0107 119/165 |
| 2002/0185390 | A1 | * | 12/2002 | Ciguere | A01K 5/0114 206/223 |
| 2004/0200424 | A1 | * | 10/2004 | Stolpe | A01K 1/0107 119/165 |
| 2005/0120963 | A1 | * | 6/2005 | Vadis | A01K 63/003 119/6.5 |
| 2005/0120968 | A1 | * | 6/2005 | Dorsey | A01K 1/0107 119/165 |
| 2006/0266672 | A1 | | 11/2006 | Young | |
| 2007/0075203 | A1 | * | 4/2007 | Conlin | A01K 1/0114 248/309.1 |
| 2009/0000558 | A1 | * | 1/2009 | Matsuo | A01K 1/0107 119/165 |
| 2009/0283049 | A1 | * | 11/2009 | Spreitzer | A01K 1/0114 119/166 |
| 2010/0071628 | A1 | * | 3/2010 | Wells | A01K 1/0107 119/169 |
| 2010/0282175 | A1 | * | 11/2010 | Bjornson | A01K 1/0125 119/168 |
| 2010/0307424 | A1 | * | 12/2010 | Evans | A01K 1/0107 119/416 |
| 2012/0255497 | A1 | * | 10/2012 | Simon | B65D 5/60 119/165 |
| 2013/0098300 | A1 | | 4/2013 | Matsuo et al. | |
| 2013/0112149 | A1 | * | 5/2013 | Robbins | A01K 1/0114 119/166 |
| 2013/0213311 | A1 | | 8/2013 | Matsuo et al. | |
| 2014/0076756 | A1 | * | 3/2014 | Sweetman | A01K 1/011 206/349 |
| 2014/0251224 | A1 | | 9/2014 | Yamamoto et al. | |
| 2015/0167265 | A1 | * | 6/2015 | Becattini, Jr. | E01H 1/1206 294/1.3 |
| 2017/0258034 | A1 | * | 9/2017 | Robbins | A01K 1/0114 |

FOREIGN PATENT DOCUMENTS

| | | | | |
|---|---|---|---|---|
| DE | 102011118546 | * | 1/2013 | ........... A01K 1/0107 |
| EP | 363292 A1 | * | 4/1990 | ............... A01K 1/01 |
| EP | 1066753 A2 | | 1/2001 | |
| EP | 2586299 A1 | | 5/2013 | |
| FR | 2593670 A1 | * | 8/1987 | ........... A01K 1/0107 |
| FR | 2666194 A1 | * | 3/1992 | ........... A01K 1/0107 |
| FR | 2858172 A1 | * | 2/2005 | ........... A01K 1/0107 |
| JP | 63-154472 U | | 10/1988 | |
| JP | 2002-321731 A | | 11/2002 | |
| JP | 2010-88361 A | | 4/2010 | |
| JP | 2010-220593 A | | 10/2010 | |
| JP | 2012-5443 A | | 1/2012 | |
| WO | WO-9639023 A1 | * | 12/1996 | ........... A01K 1/0107 |
| WO | WO-2010070352 A1 | * | 6/2010 | ........... A01K 1/0107 |
| WO | 2013/054836 A1 | | 4/2013 | |

OTHER PUBLICATIONS

International Search Report in PCT/JP2014/075419, dated Dec. 16, 2014.

Office Action in CN Application No. 201480053576.2, dated Apr. 16, 2018, 7pp.

* cited by examiner

FIG. 3
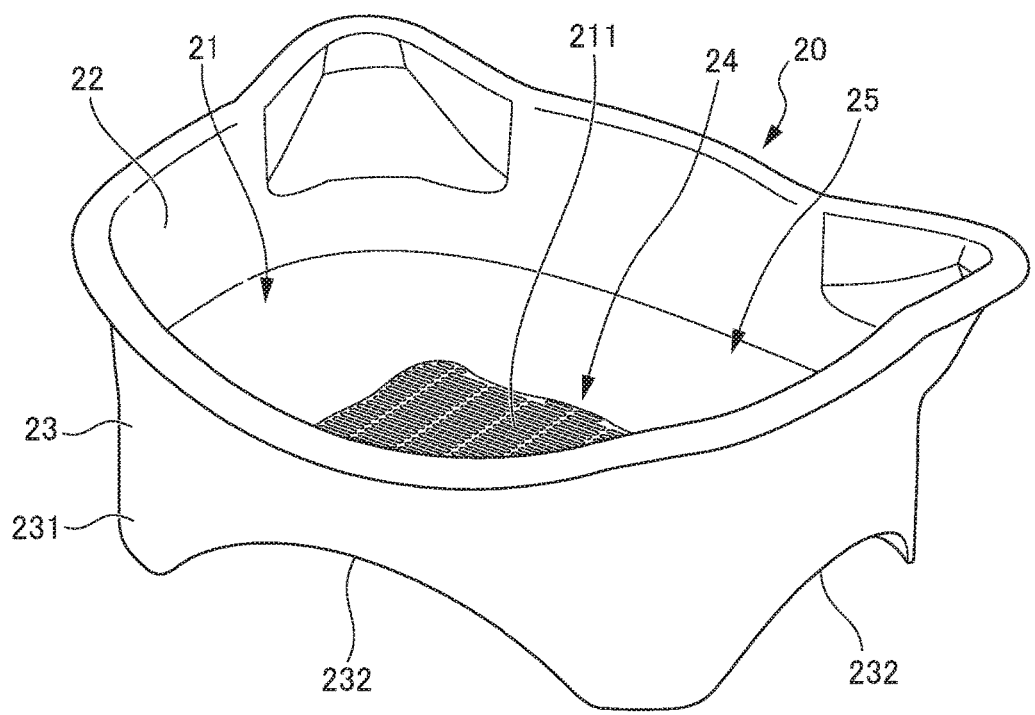
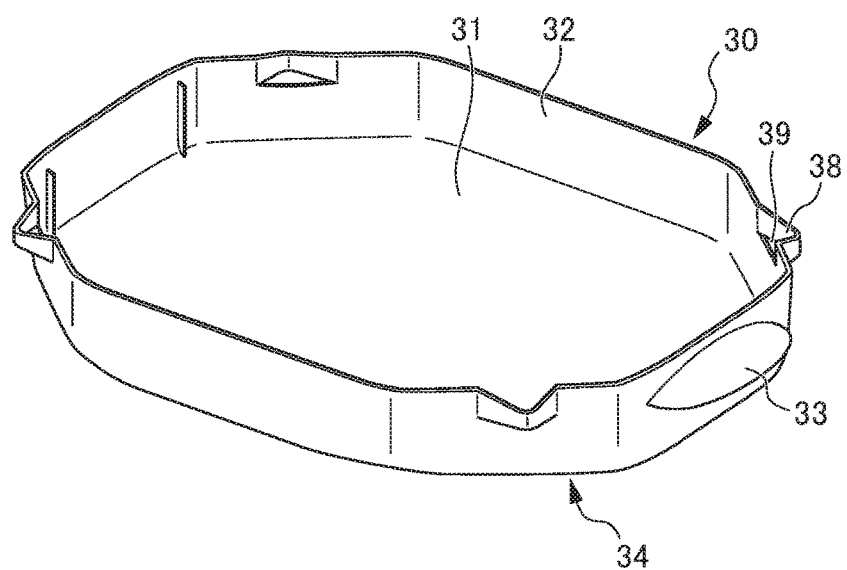

ANIMAL LITTER BOX PACKAGE BODY

RELATED APPLICATIONS

The present application is a National Phase of International Application Number PCT/JP2014/075419, filed Sep. 25, 2014, which claims priority to Japanese Application Number 2013-205841, filed Sep. 30, 2013.

TECHNICAL FIELD

The present invention relates to an animal litter box package body.

BACKGROUND ART

Heretofore, a technique of making a part of a package body transparent for marketing of an article has been known, in order to make the article and an accessory to be used therewith packaged in the package body visually recognizable before purchase (refer, for example, to Patent Document 1). The transparent part of the package body is formed of a sheet-like member, which is softer than other parts of the package body. For such a package body, strength required for distribution is secured by making only a side, which is easily recognized by consumers, transparent and by configuring other parts with a different material.

Patent Document 1: Japanese Unexamined Utility Model Application Publication No. S63-154472

DISCLOSURE OF THE INVENTION

Problems to be Solved by the Invention

In a case of distributing a container with a large opening in an upper part, such as an animal litter box, in a state in which the entire animal litter box is visually recognizable from the outside, it may be necessary to make a side face portion and a top face portion transparent. In such a case, the opening of the container is covered with a soft transparent sheet-like member and the top face portion of the package body is therefore fragile, leading to a problem of lack of strength required for stacking and distributing the package body.

An objective of the present invention is to provide a package body that packages an animal litter box with a large opening in an upper part so as to be visually recognizable from the outside, and can secure strength required for distribution.

Means for Solving the Problems

An animal litter box package body of the present invention according to the first aspect includes: an animal litter box that has an opening in an upper portion and can store animal excrement; an accessory used for the animal litter box; and a case for packaging the animal litter box and the accessory. The case includes a top face portion that covers at least the opening, a case bottom face portion that is in contact with a bottom face portion of the animal litter box, and a pair of side face portions facing one another; at least the top face portion is configured of a transparent sheet-like member. The animal litter box package body further includes an accessory storage container that stores the accessory and has a height from a top face of the bottom face portion to the top face portion of the animal litter box.

According to the second aspect, the animal litter box preferably includes a high friction region that is formed on the top face of the bottom face portion of the animal litter box.

According to the third aspect, it is preferable that the animal litter box includes: an upper container that allows an animal to enter and leave, the upper container having an upper bottom face portion provided with liquid permeable through holes; and a lower container that is disposed below the upper container, and the high friction region is configured of the through holes.

According to the fourth aspect, it is preferable that the accessory storage container includes: a storage container main body in which the accessory is stored; and a projection portion that protrudes from a lower end portion of the storage container main body, and the projection portion engages with the through hole in a state in which the accessory storage container is arranged on the upper bottom face portion.

According to the fifth aspect, the storage container main body preferably includes a cutout portion formed by cutting out so that an inner part thereof is visually recognizable.

According to the sixth aspect, the upper bottom face portion preferably includes a sloped region that is slightly acclivitous from the high friction region toward an outer periphery of the upper container.

According to the seventh aspect, the accessory storage container is preferably formed of a material having higher stiffness than the sheet-like member.

According to the eighth aspect, the case bottom face portion is preferably formed of a material having higher stiffness than the sheet-like member.

According to the ninth aspect, the animal litter box preferably has a pair of grip portions that protrudes outwards from sidewalls of the animal litter box; and the case has openings at least on sides on which the pair of grip portions is arranged.

According to the tenth aspect, the case bottom face portion is preferably provided with a fit fixing portion that fits into the grip portion in a state in which the animal litter box is packaged in the case.

Effects of the Invention

According to the present invention, a package body that packages an animal litter box with a large opening in an upper part so as to be visually recognizable from the outside, and can secure strength required for distribution can be provided.

BRIEF DESCRIPTION OF THE DRAWINGS

FIG. 3 is an exploded perspective view of the animal litter box according to the present embodiment;

PREFERRED MODE FOR CARRYING OUT THE INVENTION

Preferred embodiments of an animal litter box package body 1 according to the present invention are explained hereinafter with reference to the drawings.

Figure 1:
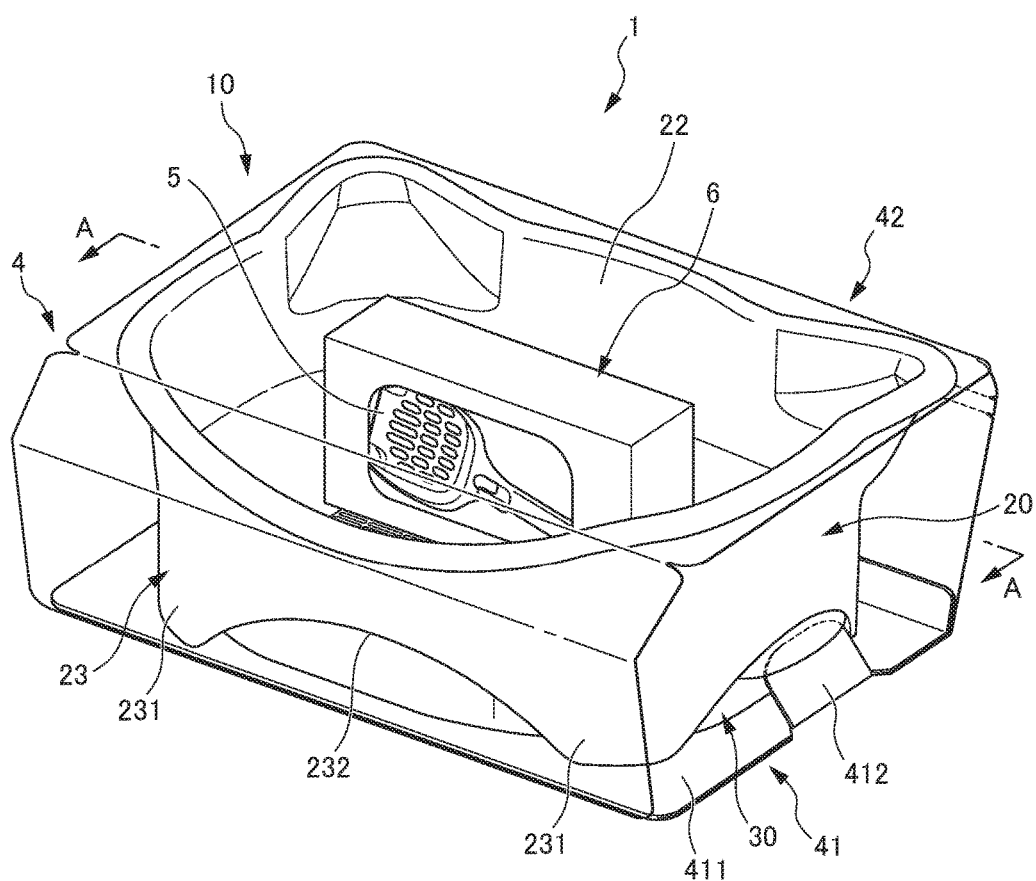
FIG. 1 is a perspective view illustrating an animal litter box package body according to the present embodiment.
Figure 2:
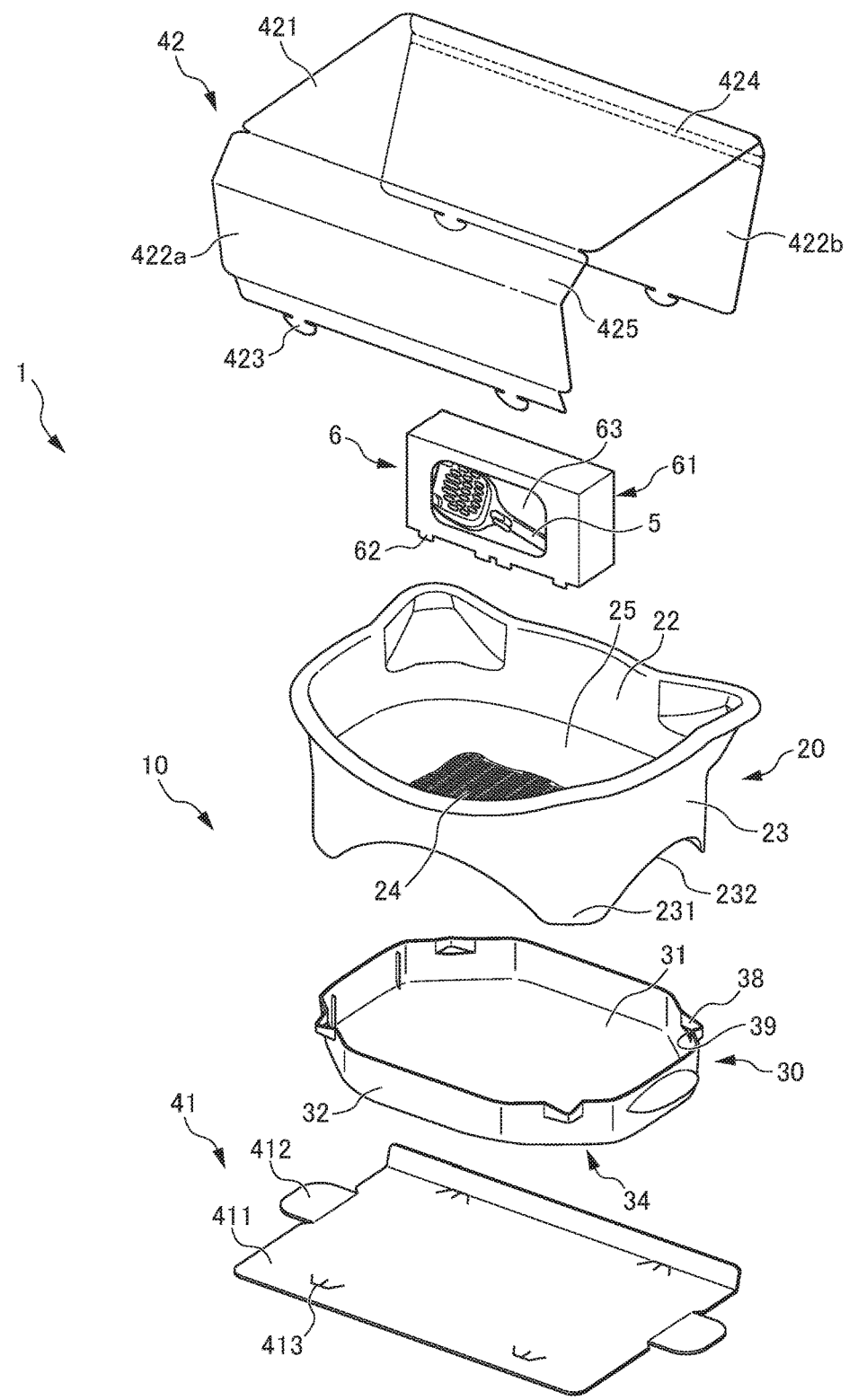
FIG. 2 is an exploded perspective view illustrating the animal litter box package body according to the present embodiment.

FIG. 1 is a perspective view illustrating the animal litter box package body 1. FIG. 2 is an exploded perspective view of the animal litter box package body 1.

The animal litter box package body 1 is provided with an animal litter box 10, a case 4, an accessory 5, and an accessory storage container 6, as illustrated in FIGS. 1 and 2. The animal litter box package body 1 is the animal litter box 10 and the accessory 5, which is stored in the accessory storage container 6, being packaged in the case 4 so as to be visually recognizable from the outside.

First, the animal litter box 10 is described.

Figure 4:
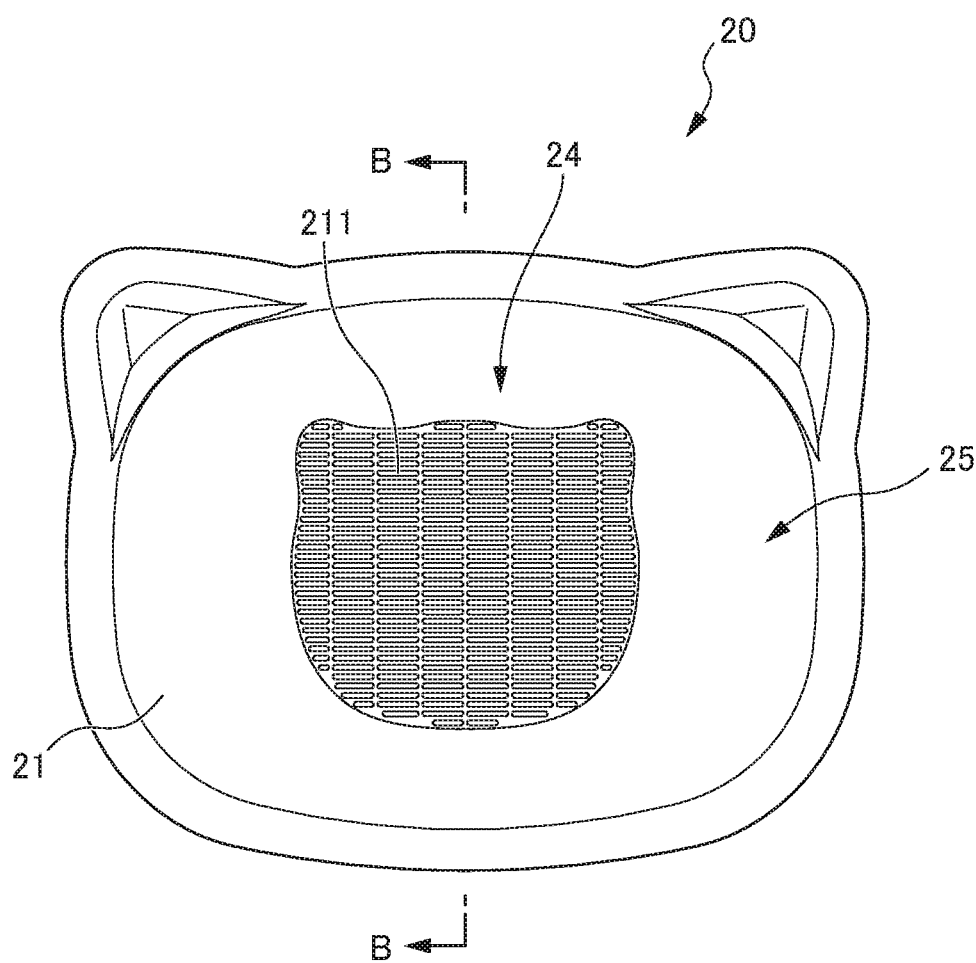
FIG. 4 is a front view of an upper container of the animal litter box according to the present embodiment.
Figure 5:
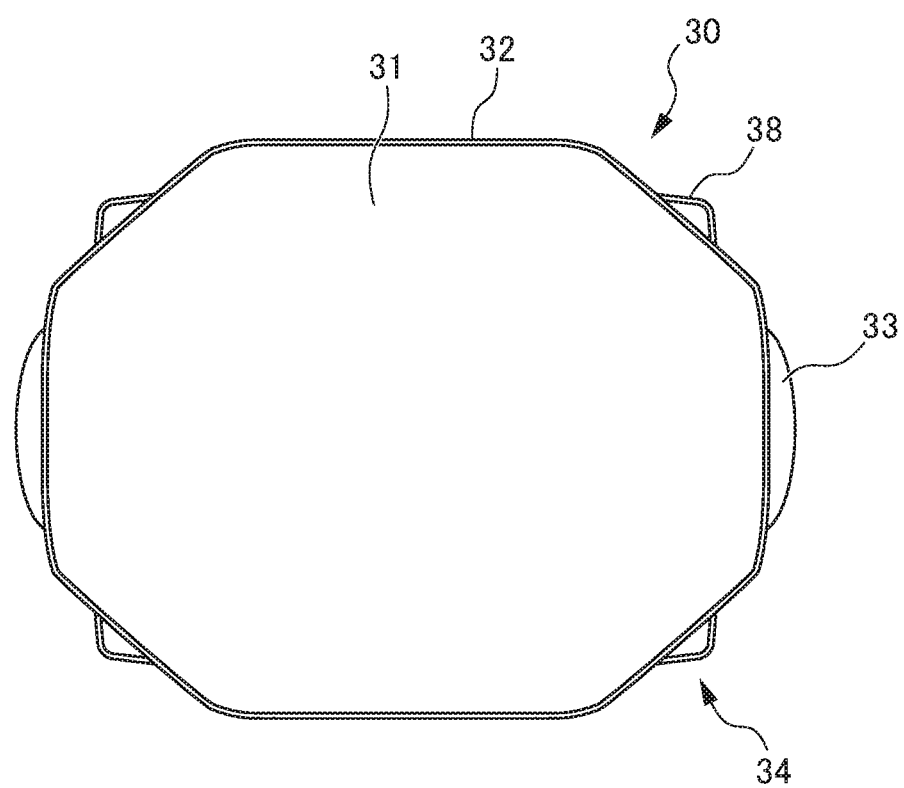
FIG. 5 is a front view of a lower container of the animal litter box according to the present embodiment.
Figure 6:
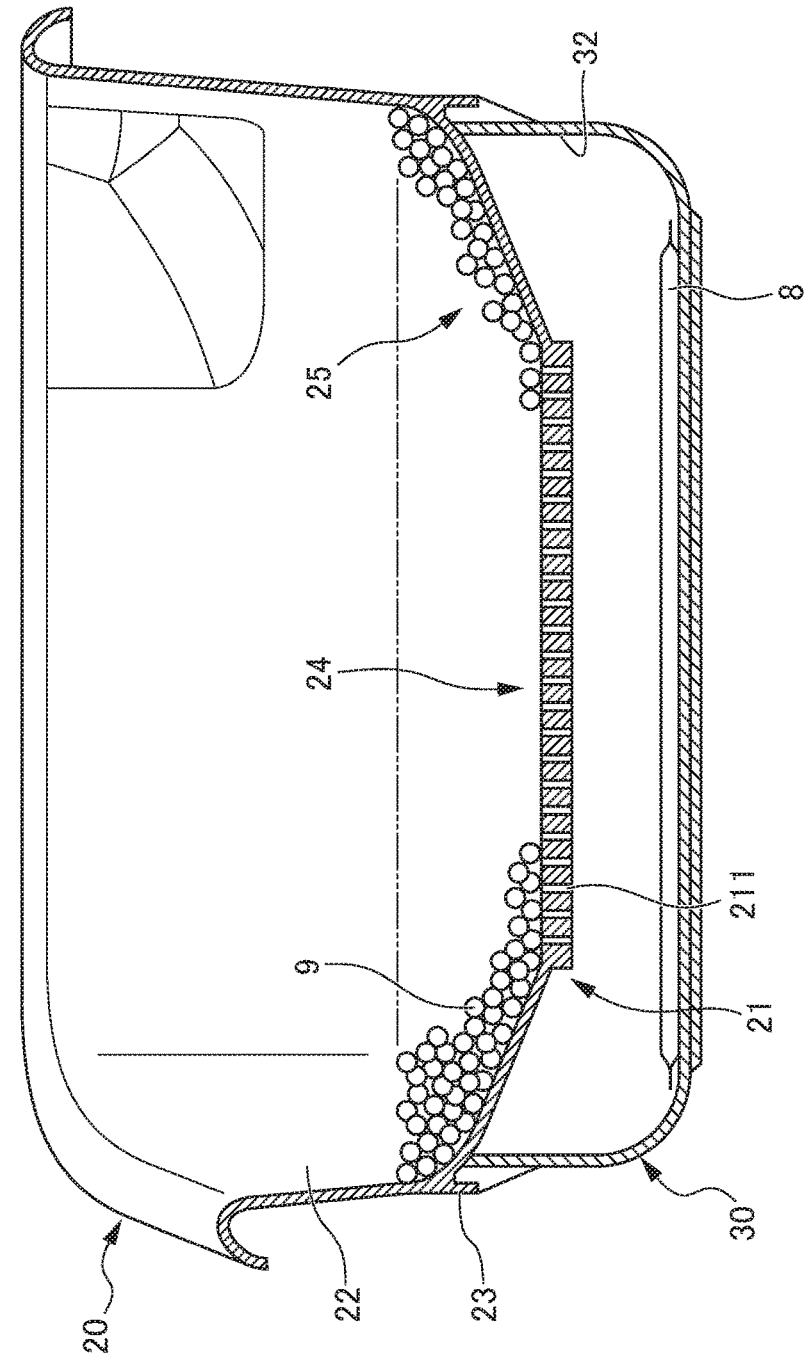
FIG. 6 is a cross-sectional view taken along a line B-B of the upper container illustrated in FIG. 4, of the animal litter box in use according to the present embodiment.

FIG. 3 is an exploded perspective view of the animal litter box 10. FIG. 4 is a front view of an upper container 20 of the animal litter box 10. FIG. 5 is a front view of a lower container 30 of the animal litter box 10. FIG. 6 is a cross-sectional view taken along a line B-B of the upper container 20 illustrated in FIG. 4, of the animal litter box 10 in use with a liquid absorbent member 8 and an excrement disposal material 9 being stored therein.

The animal litter box 10 includes the lower container 30 and the upper container 20. The animal litter box 10 is a litter box that can store excrement of a pet kept indoors, such as a cat and a dog.

The lower container 30 includes a lower bottom face portion 31, a lower sidewall portion 32, a grip portion 33, a corner portion 34, a protruding portion 38, and a through hole 39 as illustrated in FIGS. 3 and 5. The lower container 30 is a container of which top portion is open, as illustrated in FIG. 3.

As illustrated in FIG. 5, the lower bottom face portion 31 has a substantially octagonal shape, or a rectangular shape with four corners being cut off obliquely with respect to each long side and each short side, in a plan view. The lower wall portion 32 is a wall provided upright from a periphery of the lower bottom face portion 31.

The grip portion 33 is arranged on an outer face of the lower wall portion 32. The grip portion 33 is arranged at two positions face-to-face, one on each of short sides of the lower container 30. The grip portion 33 is provided to project outward from the lower container 30.

The corner portion 34 is configured of a side arranged obliquely to connect the long side and the short side, among 8 sides of the substantially octagonal shape of the lower container 30.

The protruding portion 38 is a part which protrudes to an upper side of the corner portion 34 in a dogleg shape in a plan view, as illustrated in FIGS. 3 and 5. An upper end side of the protruding portion 38 is slightly declivitous.

The through hole 39 is formed below the protruding portion 38.

The upper container 20 includes an upper bottom face portion 21, a planar portion 24, a sloped region 25, an upper wall portion 22, and an extension wall portion 23 as illustrated in FIGS. 3 and 4. The upper container 20 is arranged above the lower container 30. The upper container 20 is a container of which top portion is open, to and from which an animal enters and leaves. As illustrated in FIG. 4, the upper container 20 has a rectangular shape with four round corners in a plan view, in which ends of one long side protrude outward, thereby making a shape of an animal face.

The upper bottom face portion 21 is a bottom face of the upper container 20. The upper bottom face portion 21 also configures a top surface of the bottom face portion of the animal litter box 10 during use. The upper bottom face portion 21 includes the planar portion 24 and the sloped region 25, as illustrated in FIGS. 3 and 4.

The planar portion 24 is formed in a substantial center of the upper bottom portion 21 in a plan view, and is located at a lowermost position in a height direction of the upper bottom portion 21. The planar portion 24 is a face of the upper bottom face portion 21 extending in a substantially horizontal direction. The planar portion 24 is includes: a plurality of liquid permeable through holes 211 formed on the upper bottom face portion 21; and parts of the upper bottom face portion 21 between adjacent through holes 211. The planar portion 24 forms a high friction region.

The through holes 211 are oval holes elongated in a width direction of the upper container 20, arranged regularly vertically and horizontally in a substantially grid-like pattern. The plurality of through holes 211 thus formed makes a surface of the planar portion 24 uneven and non-skid, thereby configuring the high friction region.

The sloped portion 25 is a face which is slightly acclivitous from a periphery of the high friction region toward an outer periphery of the upper bottom face portion 21. A taper angle of the sloped region 25 is preferably 5 to 60 degrees with respect to the planar portion 24. A taper angle of the sloped region 25 of less than 5 degrees makes it difficult for urine and the like of an animal to run toward the high friction region and drain to the lower container 30. A taper angle of the sloped region 25 of greater than 60 degrees results in a confined space for an animal to place its paws stably in the upper container 20. A taper angle within the above specified range is thus preferred.

As illustrated in FIG. 2, the upper wall portion 22 is upright from the periphery of the upper bottom portion 21 and extends upward. The upper wall portion 22 extends to an upper end of the upper container 20 and warps outward at the upper end.

The extension wall portion 23 is formed to extend from an outer face of the upper wall portion 22. The extension wall portion 23 is arranged such that a lower end portion thereof is positioned below the upper bottom portion 21 downwardly. As illustrated in FIG. 1, in a state in which the upper container 20 is arranged above the lower container 30, the extension wall portion 23 is arranged more to an outer side than the lower sidewall portion 32.

The extension wall portion 23 has a foot 231 and a notch portion 232.

In the present embodiment, the number of the feet 231 is 4. The foot 231 is formed such that a lower end thereof is in contact with an installation surface 10, such as a floor, for the animal litter box 10 and the foot extends upward to support the upper container 20. The foot 231 is formed along a curve connecting the long side and the short side of the upper container 20. The foot 231 is arranged at a position corresponding to the corner portion 34, on an outer side of the corner portion 34. When a user places the upper container 20 onto the lower container 30 to cover, the user can verify the position of the foot 231 to position it outside the lower container 30 while avoiding the protruding portion 38 of the lower container 30, and, since an upper end side of the protruding portion 38 is declivitous, the user can move the foot 231 along the declivitous portion on an upper end of the protruding portion 38.

The notch portion 232 is formed by notching a lower end side edge of the extension wall portion 23 so as to sweep upward. The outer face of the lower wall portion 32 is exposed through the notch portion 232. The notch portion 232 is provided in a symmetrical manner on faces of the extension wall portion 23 that are arranged face-to-face.

The above described grip portion 33 on the lower container 30 is provided at a position corresponding to a position on the upper container 20 at which the notch portion 232 is formed. As a result, as illustrated in FIG. 1, the grip portion 33 projects outward from a sidewall on a longitudinal end side of the upper container 20, in a state in which the lower container 30 is arranged below the upper container 20.

The animal litter box 10 described thus far is, as illustrated in FIG. 6, used in a state in which the liquid absorbent member 8 is placed in the lower container 30 and the granular excrement disposal material 9 is housed in the upper container 20 when in use.

The liquid absorbent member 8 is a member that can absorb animal excrement such as urine. The liquid absorbent member 8 is a rectangular sheet in which a liquid permeable top sheet, a liquid retainable intermediate sheet, and a liquid impermeable back sheet are layered and joined.

Since the liquid absorbent member 8 is rectangular and the lower container 30 is substantially octagonal with the corner portions 34, the liquid absorbent member 8 may be bent at the corner portions 34 when placed in the lower container. In this case, by pulling out corners of the liquid absorbent member 8 from the through holes 39, the liquid absorbent member 8 can be prevented from wrinkling up and moving around.

The excrement disposal material 9 is a granular disposal material so-called litter that absorbs and lets through animal excrement such as urine. Granular matters of various materials, including one that is hydrophobic and lets through a large quantity of liquid to the liquid absorbent member 8 and one that is solidified as it absorbs liquid such as urine, are used appropriately as the litter.

The above described animal litter box 10 is a system litter box used as follows. An animal enters the upper container 20 and excretes in a state in which the liquid absorbent member 8 is placed in the lower container 30 and the granular excrement disposal material 9 is housed in the upper container 20. Then, liquid such as urine passes through the excrement disposal material 9 and then through the through holes 211 formed on the upper bottom face portion 21, and is absorbed by the liquid absorbent member in the bottom container 30. On the other hand, solid such as feces remains on the excrement disposal material 9. The user uses a scoop, which is the accessory 5, to remove and dispose of the feces as well as the excrement disposal material 9 adhered therearound. The liquid absorbent member 8 having absorbed urine is changed. When the excrement disposal material 9 is significantly reduced in amount due to the removal, it is replenished as appropriate, so as to allow the animal to comfortably excrete.

The case 4 is described hereinafter.

Figure 7:
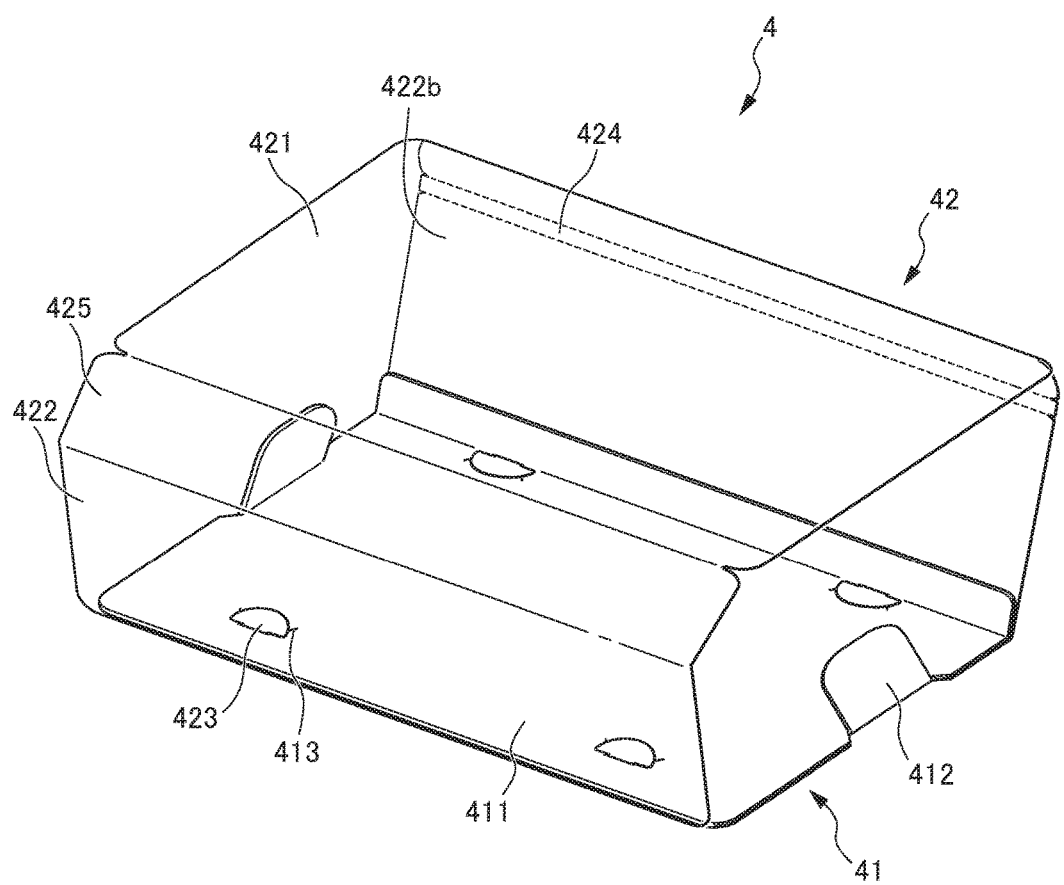
FIG. 7 is a perspective view of a case according to the present embodiment.
Figure 8A:
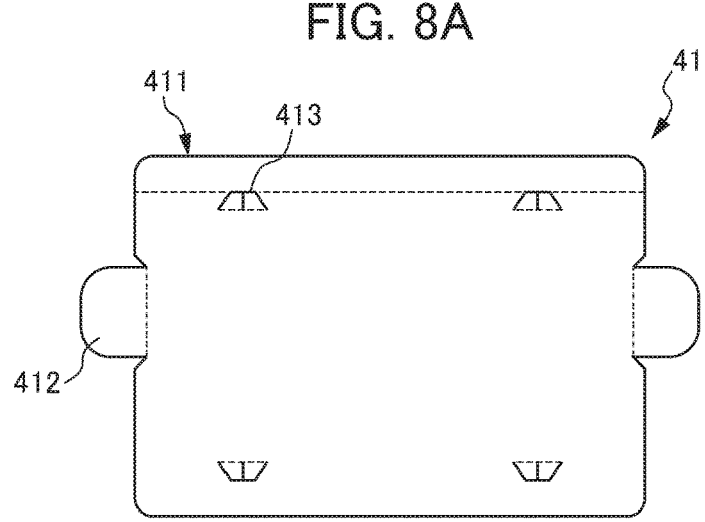
FIG. 8A is a development view of a bottom plate portion of the case according to the present embodiment.

FIG. 7 is a perspective view of the case 4. FIG. 8A is a development view of a bottom plate portion 41 of the case 4, and FIG. 8B is a development view of a cover portion 42 of the case 4.

The case 4 packages the animal litter box 10, as well as the accessory 5 and the accessory storage container 6 described later. As illustrated in FIGS. 7, 8A and 8B, the case 4 includes the bottom plate portion 41 as the case bottom face portion and the cover portion 42. The case 4 is formed in a substantially tube-like shape so as to cover four sides of the animal litter box 10 in a state in which the animal litter box 10 is arranged thereinside. In the case 4, at least sides on which the grip portions 33 of the animal litter box 10 are arranged are open.

Figure 8B:
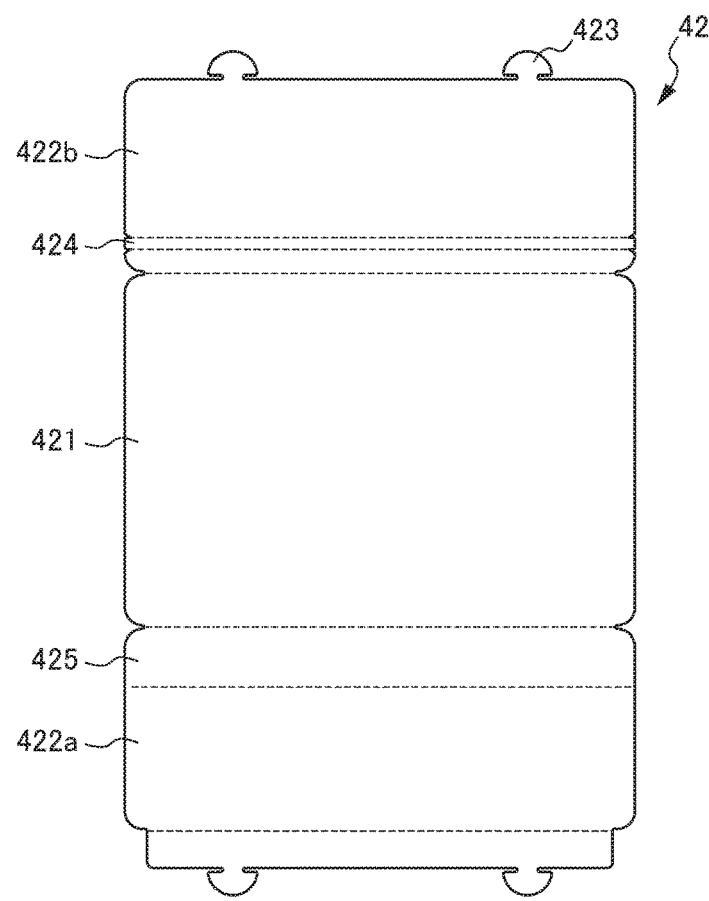
FIG. 8B is a development view of a cover portion of the case according to the present embodiment.

As illustrated in FIGS. 7 and 8B, the cover portion 42 is formed of a substantially rectangular transparent sheet-like member. More specifically, the cover portion 42 is configured of a material such as polypropylene, and is stiff enough not to easily break when the animal litter box package body 1 is stacked or squeezed from the outside. The cover portion 42 has a top face portion 421, a pair of side face portions 422 (422a, 422b) and an engaging projection portion 423.

The cover portion 42 can be formed by using, other than polypropylene, silicon rubber, polyethylene terephthalate (PET), nylon, polyethylene (PE), polyvinyl chloride (PVC), or a composite material thereof. The cover portion 42 preferably has, for example, yield strength of 30 MPa to 40 MPa as stiffness, when measured according to JIS K7113 (Testing method for tensile properties of plastics).

The top face portion 421 is a portion that covers the opening of the upper container 20 of the animal litter box 10, and is formed in a substantially central part in the longitudinal direction of the substantially rectangular sheet-like member as illustrated in FIG. 8B.

The pair of side face portions 422 is arranged on both sides of the top face portion 421, so as to face each other in a state of packaging the upper container 20. Borderlines between the pair of side face portions 422 and the top face portion 421 are formed by folding widthwise the sheet-like member configuring the cover portion 42.

The pair of side face portions 422 respectively has an unpackage portion 424 and a bevel portion 425.

The bevel portion 425 is provided in a first side face portion 422a, in a border between this side face portion 422a and the top face portion 421. The bevel portion 425 is a portion having a predetermined width in a width direction of the cover portion 42, formed by folding at a border line between the side face portion 422a and the top face portion 421, as well as at a position at a predetermined distance from the border line. The bevel portion 425 is formed so as to be in contact with a part of an upper end edge of the upper container 20 that inclines to be lower than other portions of the upper end edge, the part being for use as an entrance for the animal.

The unpackage portion 424 is a perforated line provided in the vicinity of a borderline between a second side face portion 422b, which does not have the bevel portion 425, and the top face portion 421 and is formed along the width direction of the cover portion 42.

The engaging projection portion 423 is a projecting face that protrudes outwards from a side extending in the width direction of the cover portion 42. Four engaging projection portions 423 in total are formed at intervals, two on each of the sides extending in the width direction of the cover portion 42.

The bottom plate portion 41 is arranged below the lower bottom face portion 31 that configures a bottom face portion of the animal litter box 10. The bottom plate portion 41 is formed of a substantially rectangular plate-like member that has higher rigidity than the sheet-like member. The bottom plate portion 41 is formed of, for example, cardboard. The bottom plate portion 41 is formed of a material that is stiff enough not to bend or collapse when being carried with the animal litter box 10 being placed thereonto. The bottom plate portion 41 has a bottom plate body portion 411, a fit fixing portion 412, and an engaging slit portion 413.

The bottom plate body portion 411 is a substantially rectangular portion that configures a main part of the bottom plate portion 41.

The fit fixing portion 412 is formed on both ends in the longitudinal direction of the bottom plate body portion 411 so as to protrude outwards from a substantially center part of a side edge along the width direction.

Figure 10:
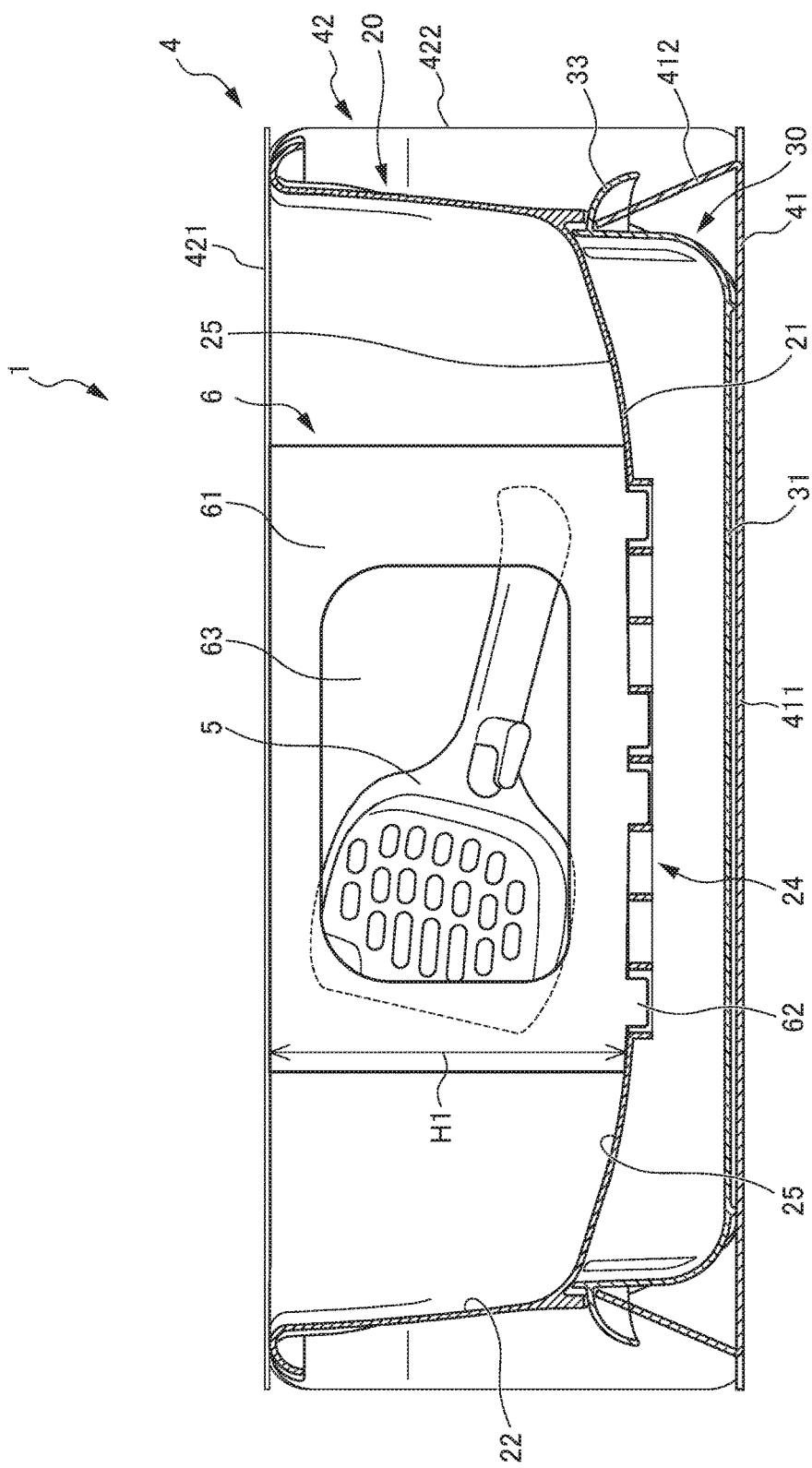
FIG. 10 is a cross-sectional schematic view, taken along a line A-A of the animal litter box illustrated in FIG. 1.

The fit fixing portion 412 is formed of the same material as the bottom plate body portion 411, and is bent upward at a border part with respect to the bottom plate body portion 411. As illustrated in FIGS. 1 and 10, the fit fixing portion 412 is arranged to fit into the reverse side of the grip portion 33 of the lower container 30, in a state in which the animal litter box 10 is packaged in the case 4. Given the above, a distance D from the border part between the fit fixing portion 412 and the bottom plate body portion 411 to an end of the fit fixing portion 412 in a longitudinal direction of the bottom plate portion 41 is selected such that the fit fixing portion 412 in a folded state can fit into the reverse side of the grip portion 33.

Two engaging slit portions 413 are formed at an interval along each longitudinal side edge of the bottom plate body portion 411, providing four in total symmetrically on a pair of longitudinal side edges facing each other. The engaging slit portions 413 are arranged such that a distance therebetween along each longitudinal side edge corresponds to a distance between the engaging projection portions 423 formed on the cover portion 42. In addition, each of the engaging slit portions 413 is formed by slitting a length allowing insertion of the engaging projection portion 423. As illustrated in FIGS. 2 and 7, the engaging projection portion 423 is inserted into the engaging slit portion 413 from a reverse side of the bottom plate body portion 411 and engaged therewith.

On a surface of the above described cover portion 42, a desired print can be applied. In this case, by forming a transparent coating layer such as varnish on the printed surface of the covering portion 42, abrasion on the surface of the covering portion 42 and peeling of the print can be prevented.

The accessory 5 and the accessory storage container 6 are described hereinafter.

Figure 9:
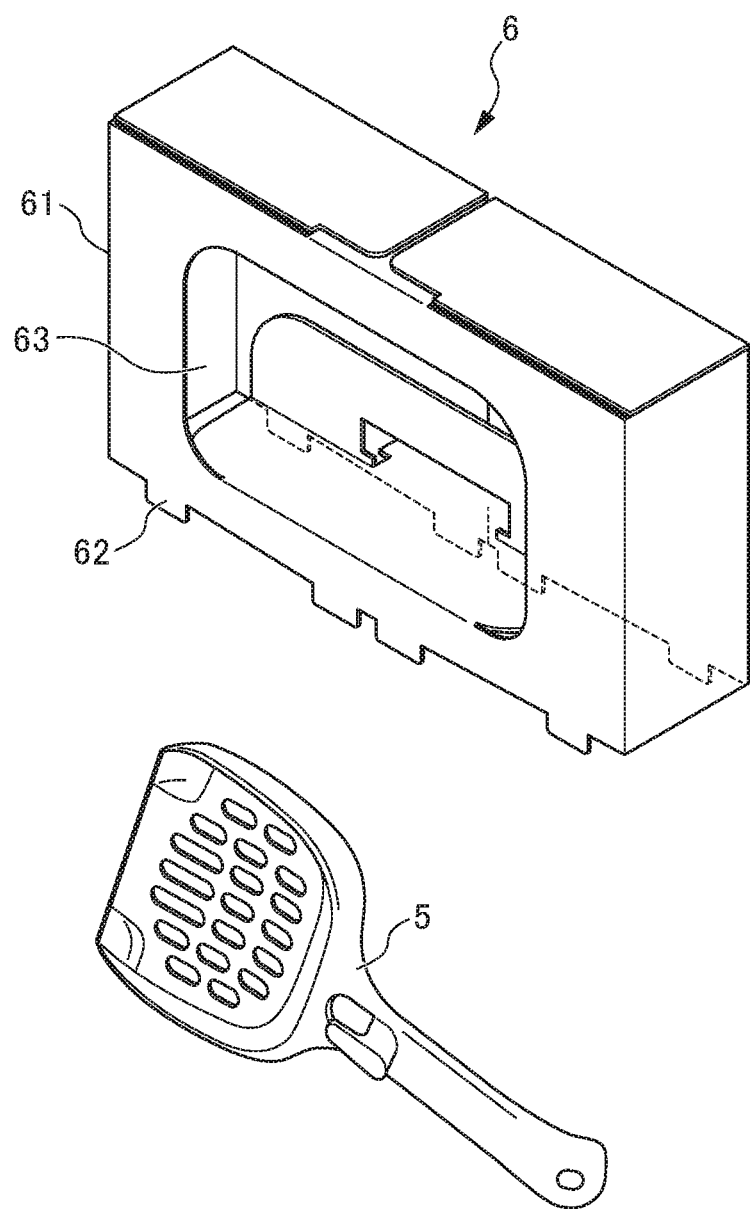
FIG. 9 is a perspective view of an accessory and an accessory storage container according to the present embodiment.

FIG. 9 is a perspective view of the accessory 5 and the accessory storage container 6 according to the present embodiment. FIG. 10 is a cross-sectional schematic view, taken along a line A-A of the animal litter box illustrated in FIG. 1.

The accessory 5 is an article used with the animal litter box 10, which is a scoop 5 in the present embodiment. The scoop 5 has a shaft and a bottomed bowl part provided at an end thereof. The scoop 5 is used during use of the animal litter box 10, for removing feces as well as the excrement disposal material 9 adhered therearound.

The animal litter box package body 1 can store, in addition to the scoop 5, the liquid absorbent member 8 and the excrement disposal material 9.

The accessory storage container 6 is a substantially rectangular parallelepiped box that can store the scoop 5. The accessory storage container 6 includes a storage container main body 61, a projection portion 62, and a cutout portion 63. The accessory storage container 6 is formed of a material that is stiffer than the sheet-like member composing the cover portion 42. The accessory storage container 6 is formed of, for example, cardboard.

The storage container main body 61 is a substantially rectangular parallelepiped part that configures a main part of the accessory storage container 6. The storage container main body 61 stores the scoop 5. As illustrated in FIG. 10, the storage container main body 61, in a state of being placed on the upper bottom face portion 21, has a height substantially equal to a height H1 from an inner face of the upper bottom face portion 21 to the top face portion 421 of the cover portion 42. More specifically, the storage container main body 61 preferably has a height equal to or slightly smaller than the height H1, with a margin of error of plus or minus 5 mm.

The projection portion 62 is a plurality of projections that protrudes from the lower end portion of the storage container main body 61. In particular, the projection portion 62 is formed with a part of the side face of the storage container main body 61 extending downwards. The projection portion 62 is formed so as to have a dimension allowing insertion into the through hole 211 provided on the upper bottom face portion 21. As illustrated in FIG. 9, in a state in which the accessory storage container 6 is arranged on the upper bottom face portion 21, the projection portion 62 is inserted into and engages with the through hole 211 to thereby fix the storage container main body 61.

The cutout portion 63 is a through hole formed by cutting out a side face portion of the storage container main body 61. The cutout portion 63 is a substantially rectangular hole that is slightly smaller than the side face portion of the storage container main body 61, and through which the scoop 5 stored therein can be visually recognized from the outside.

The animal litter box package body 1 according to the present embodiment described thus far provides the following operations and effects.

(1) In the animal litter box package body 1 including the animal litter box 10, the accessory 5, and the case 4, the case 4 includes the top face portion 421 that covers at least the opening, the bottom plate portion 41 that is in contact with the bottom face portion 31 of the animal litter box 10, and a pair of side face portions 422 facing one another; and at least the top face portion 421 is configured of a transparent sheet-like member. The animal litter box package body 1 is configured to further include the accessory storage container 6 that stores the accessory 5 and has a height from the upper bottom face portion 21, which configures a top face of the bottom face portion, to the top face portion 421 of the animal litter box 10. Since the accessory storage container 6 thus functions as a support strut to support the top face portion 421 of the case 4 that is configured of the transparent sheet-like member and covers the opening of the animal litter box, the animal litter box package body 1 is not easily broken even if the animal litter box package body 1 is stacked or something is placed on the top face portion 421. As a result, even in a case of packaging the animal litter box 10 with a large opening in an upper part so as to be visually recognizable from the outside, strength required for distribution can be secured.

(2) The animal litter box 10 is configured to include the high friction region provided on the upper bottom face portion 21 configuring the top face of the bottom face portion of the animal litter box 10. As a result, by placing the accessory storage container 6 on the high friction region, the accessory storage container 6 can be prevented from being misaligned or from moving around in the animal litter box 10, due to a high friction coefficient between the accessory storage container 6 and the high friction region.

(3) The animal litter box 10 is configured to include the upper container 20 in which the high friction region is provided and the lower container 30 that is arranged below the upper container 20; and the high friction region is configured of the through hole 211 provided on the upper bottom face portion 21. As a result, when the excrement disposal material 9 is stored in the upper container 20 and an animal excretes, liquid such as urine can permeate from the upper container 20 to the lower container 30.

(4) The accessory storage container 6 is configured to include the storage container main body 61 in which the accessory 5 is stored and the projection portion 62 that protrudes from a lower end portion of the storage container main body 61, and in a state in which the accessory storage container 6 is arranged on the upper bottom face portion 21, the projection portion 62 engages with the through hole 211. Since the projection portion 62 engages with the through hole 211, the accessory storage container 6 can be prevented from moving around in the upper container 20.

(5) The storage container main body 61 is configured to include the cutout portion 63 formed by cutting out so that an inner part thereof is visually recognizable. As a result, in a state in which the accessory storage container 6 is placed in the animal litter box 10, the accessory 5 stored inside the accessory storage container 6 can be visually recognizable from the outside.

(6) The upper bottom face portion 21 is configured to include the sloped region 25 that is slightly acclivitous from the high friction region toward an outer periphery of the upper container 20. Since the high friction region in which the accessory storage container 6 is arranged is a lower surface and an outer periphery thereof is slightly acclivitous, the accessory storage container 6 can be prevented from moving from the high friction region to a peripheral region of the upper container 20.

The accessory storage container 6 functions as a supporting strut to support the top face portion 421 of the case 4. Here, if the accessory storage container 6 moves outwards from the high friction region of the upper bottom face portion 21 and reaches an edge of the upper container 20, the upper container 20 has a large empty space in a central part thereof. This increases a risk of collapse of the case 4. However, since the upper bottom face portion 21 is configured to include the high friction region and the sloped region in a periphery thereof, and the accessory storage container 6 does not easily move to the periphery of the high friction region, the accessory storage container 6 can be secured to the vicinity of a center of the upper container 20.

(7) The accessory storage container 6 is formed of a material that is stiffer than the sheet-like member. As a result, the highly stiff accessory storage container 6 can support the top face portion 421 even when the top face portion 421 configured of the sheet-like member is bent or the like.

(8) The bottom plate portion 41 is formed of a material that is stiffer than the sheet-like member. This allows a robust configuration of the bottom plate portion 41 onto which a load of the animal litter box 10 is applied. The animal litter box 10 provided with the upper container 20 and the lower container 30 can thus be fully supported.

(9) The animal litter box 10 is configured to include a pair of grip portions 33 that protrudes outwards from sidewalls of the animal litter box 10; and the case 4 is configured to have openings at least on sides on which the pair of grip portions 33 is arranged. As a result, carrying the animal litter box package body 1 is easier, since one can grip the grip portion 33 of the animal litter box 10 through the openings of the case.

(10) The bottom plate portion 41 is configured to include the fit fixing portion that fits into the grip portion 33 in a state in which the animal litter box 10 is packaged in the case 4. Since the bottom plate portion 41 of the case 4 thus fits into the grip portion 33 of the animal litter box 10, detachment of the animal litter box 10 from the case 4 can be prevented.

Preferred embodiments of the present invention have been explained above; however, the present invention is not limited thereto and can be modified appropriately.

Figure 11:
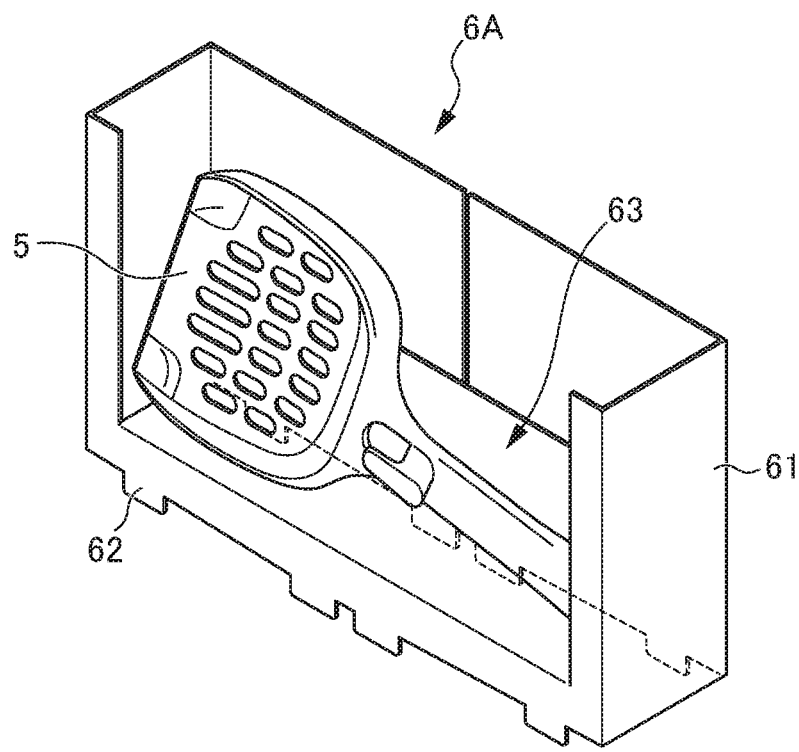
FIG. 11 is a perspective view of an accessory and an accessory storage container according to another modification of the present embodiment.
Figure 12:
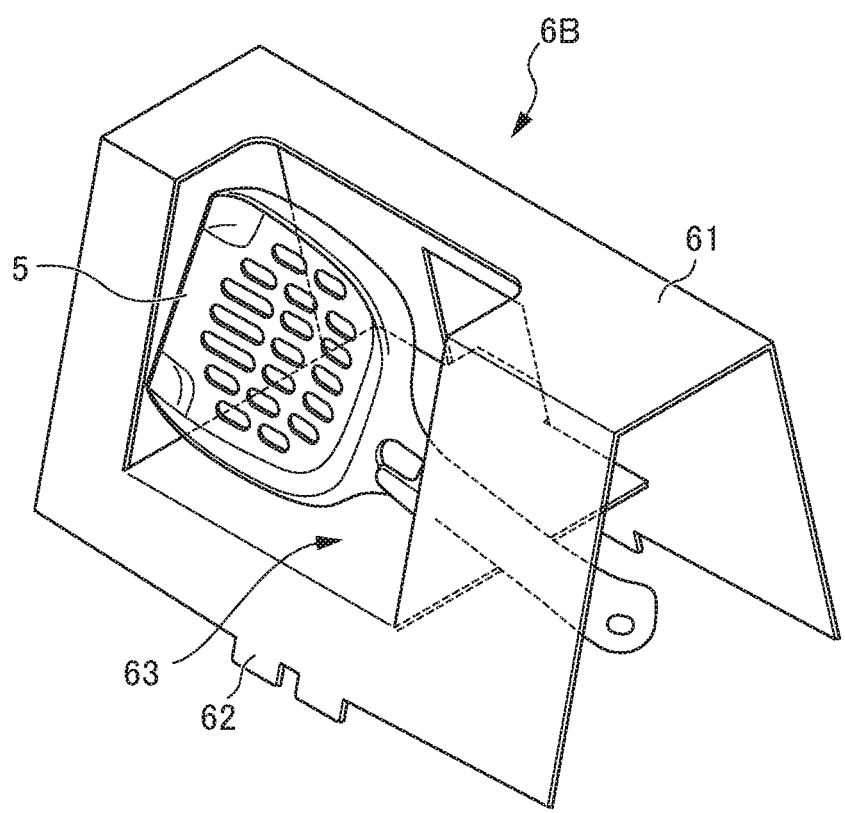
FIG. 12 is a perspective view of an accessory and an accessory storage container according to another modification of the present embodiment.

For example, in the above described embodiments, the accessory storage container 6 has the storage container main body 61 which is substantially rectangular parallelepiped; however, the shape is not necessarily limited to a rectangular parallelepiped. FIGS. 11 and 12 are perspective views of the accessory storage containers 6A, 6B as well as the accessory 5 according to another modification of the present embodiment.

As illustrated in FIG. 11, the storage container main body can be open, without having a top face portion that is in contact with the top face portion 421 of the cover portion 42. Even in a case of being open, since the top face portion 421 of the cover portion 42 is supported by an upper edge of a side without the cutout portion along the longitudinal direction and by upper edges of a pair of sides along the width direction of the storage container main body, a similar effect to that of (1) can be provided. In addition, since the storage container main body does not have a top face portion, the material required for configuring the accessory storage container 6A can be reduced, and a manufacturing cost can thus be reduced.

In addition, as illustrated in FIG. 12, the storage container main body can have a trapezoidal cross section with a lower side being wider. The accessory storage container 6B with the storage container main body having a trapezoidal cross section can support the top face portion 421 of the cover portion 42 more stably, in addition to providing a similar effect to that of (1).

In addition, in the above described embodiments, the projection portion 62 of the accessory storage container 6 is configured to engage with the through hole 211; however, the present invention is not limited thereto. The projection portion 62 can be provided with another member that is in contact with the high friction region of the upper bottom face portion 21 to increase friction, thereby preventing misalignment of the accessory storage container 6.

In addition, in the above described embodiments, the top face portion 421 and the pair of side face portions 422 of the cover portion 42 are configured of the transparent sheet-like member; however, the present invention is not limited thereto. In the cover portion 42, only the top face portion is required to be transparent and the pair of side face portions 422 can be non-transparent.

In addition, in the above described embodiments, the case 4 has openings at least on sides on which the pair of grip portions 33 is arranged; however, the present invention is not limited thereto. The case can have a second pair of side face portions, facing each other, on sides on which the pair of grip portions is arranged. In other words, the case can be a box body configured of: the top face portion; four side portions; and the bottom plate portion. In this case, the top face portion is required to be transparent, while other portions can be configured of cardboard and the like. If the case is configured to be a box body, the case is sealed and an effect of preventing dust and the like from entering inside thereof is provided in addition to the effects (1) to (8).

EXPLANATION OF REFERENCE NUMERALS

1 Animal litter box package body
4 Case
5 Accessory
6 Accessory storage container
10 Animal litter box
20 Upper container
21 Upper bottom face portion (bottom face portion of animal litter box)
25 Sloped region
30 Lower container
33 Grip portion
41 Bottom plate portion (bottom face portion of case)
61 Storage container main body
62 Projection portion
63 Cutout portion
24 Planar portion (high friction region)
211 Through hole
412 Fit fixing portion
421 Top face portion
422 Side face portion

The invention claimed is:

1. An animal litter box package body comprising:
an animal litter box that has an opening in an upper portion and is configured to store animal excrement;
an accessory used for the animal litter box; and
a case for packaging the animal litter box and the accessory, wherein
the case includes
a top face portion that covers at least the opening,
a case bottom face portion opposing to the top face portion and supporting the animal litter box, and
a pair of side face portions facing one another;
at least the top face portion includes a transparent sheet-shaped member,
the animal litter box package body further comprises an accessory storage container that stores the accessory and has a height extending from a top face of a bottom face portion of the animal litter box to the top face portion of the case,
the animal litter box includes
an upper container that is configured to allow an animal to enter and leave, the upper container having an upper bottom face portion defining the top face of the bottom face portion of the animal litter box and provided with liquid permeable through holes; and
a lower container that is disposed below the upper container,
a high friction region is formed on the top face of the bottom face portion of the animal litter box and includes the through holes, and
the accessory storage container includes
a storage container main body in which the accessory is stored; and
a projection portion that protrudes from a lower end portion of the storage container main body, wherein the projection portion engages with one of the through holes in a state in which the accessory storage container is arranged on the upper bottom face portion.

2. The animal litter box package body according to claim 1, wherein
the storage container main body includes a cutout portion formed by cutting, and
an inner part of the storage container main body is visually recognizable through the cutout portion.

3. The animal litter box package body according to claim 1, wherein
the upper bottom face portion includes a sloped region that is slightly acclivitous from the high friction region toward an outer periphery of the upper container.

4. The animal litter box package body according to claim 1, wherein
the accessory storage container is formed of a material having higher stiffness than the sheet-shaped member.

5. The animal litter box package body according to claim 1, wherein
the case bottom face portion is formed of a material having higher stiffness than the sheet-shaped member.

6. The animal litter box package body according to claim 1, wherein
the animal litter box has a pair of grip portions that protrudes outwards from sidewalls of the animal litter box, and
the case has openings at least on sides on which the pair of grip portions is arranged.

7. The animal litter box package body according to claim 6, wherein
the case bottom face portion is provided with a fit fixing portion that fits into one of the grip portions in a state in which the animal litter box is packaged in the case.

8. An animal litter box package body comprising:
an animal litter box that has an opening in an upper portion and is configured to store animal excrement;
an accessory used for the animal litter box; and
a case for packaging the animal litter box and the accessory, wherein
the case includes
a top face portion that covers at least the opening,
a case bottom face portion opposing to the top face portion and supporting the animal litter box, and
a pair of side face portions facing one another;
at least the top face portion includes a transparent sheet-shaped member,
the animal litter box package body further comprises an accessory storage container that stores the accessory and has a height extending from a top face of a bottom face portion of the animal litter box to the top face portion of the case,
the animal litter box has a pair of grip portions that protrudes outwards from sidewalls of the animal litter box,
the case has openings at least on sides on which the pair of grip portions is arranged, and the case bottom face portion is provided with a fit fixing portion that fits into one of the grip portions in a state in which the animal litter box is packaged in the case.

* * * * *